Aug. 30, 1949.  G. W. BLAIR ET AL  2,480,316
METHOD OF MAKING LAMINATED CUSHION MATERIAL
Original Filed Jan. 2, 1942
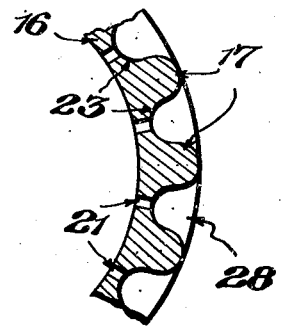
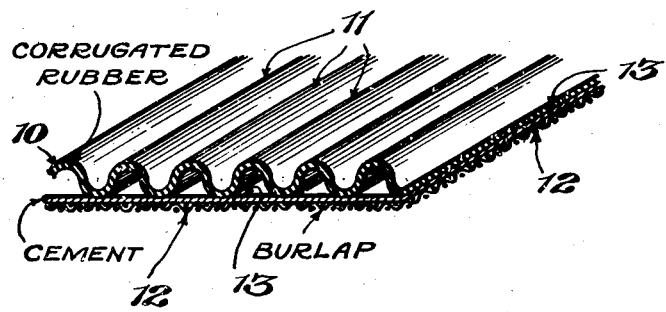
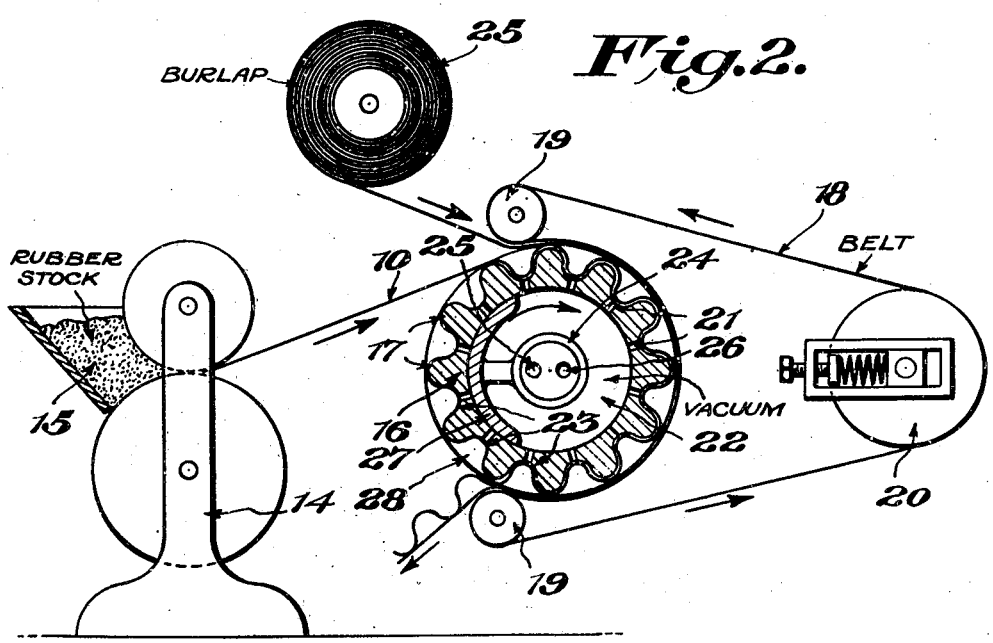
Inventors
Virgil H. Bodle,
George W. Blair,
By Eugene M. Giles
Attorneys Patented Aug. 30, 1949

2,480,316

UNITED STATES PATENT OFFICE 2,480,316

METHOD OF MAKING LAMINATED CUSHION MATERIAL

George W. Blair, Mishawaka, Ind., and Virgil H. Bodle, Los Angeles, Calif., assignors to Mishawaka Rubber and Woolen Manufacturing Company, Mishawaka, Ind., a corporation of Indiana Continuation of application Serial No. 425,462, January 2, 1942. This application November 11, 1944, Serial No. 562,986

3 Claims. (Cl. 154—33.05)

This invention relates to elastically yieldable laminated flexible material, and an improved method of making such material, and this application is a continuation of our prior application, Serial No. 425,462, filed January 2, 1942, now abandoned.

While capable of many uses, the product of the present invention is particularly adapted as a carpet or rug underlay. In such adaptation, it provides a rug padding having desirable cushioning and anti-slip or non-skid properties.

It is an important object of the invention to produce a strong, durable and inexpensive material which will possess elastically yieldable characteristics in the direction of the depth or thickness of the material, thereby particularly adapting the material for use as a carpet or rug underlay.

The product of the present invention includes a thin sheet of rubber material shaped to provide hollow open sided embossments, and a backing sheet, such for instance as burlap, Osnaburg, or other inexpensive fabric, preferably of relatively open weave, applied and secured to one side of the rubber sheet and closing open sides of the embossments, thereby reinforcing the embossments and preventing collapse thereof under stress applied thereto and trapping atmospheric air in the embossments so as to provide the product with a plurality of air cells of material size such as will give cushioning or elastically yieldable characteristics to the product.

It is an important object of the invention to provide an improved method of and apparatus for producing the rubber lamination or sheet element and embossing the same in a continuous operation, and at the same time applying and securing the backing element thereto, whereby the complete material may be produced as a continuous operation and the composite material made in continuous sheets of any desired lengths in a simple and inexpensive manner.

The present invention permits of the use of inexpensive rubber stock such as may be calendered into thin rubber sheets of slight elastic characteristics, and it is an object of the present invention to provide for including such a sheet in a composite product which is elastically yieldable in the direction of its depth or thickness for the purpose of the present invention.

In the drawings:

Figure 1 is a sectional perspective view of the product of the present invention.

Figure 2 is a diagrammatic view in side elevation of an embodiment of an apparatus for carrying out the method of the present invention.

Figure 3 is an enlarged fragmentary detail of the embossment-forming drum.

The product of the present invention has been shown in Figure 1, wherein 10 designates a thin, more or less flimsy, sheet or lamination of rubber, bent, shaped or otherwise formed into convolutions, corrugations or hollow ribs 11, which in the present embodiment, are shown as extending transversely across the width of the sheet and constituting open sided embossments. Applied to one side of the rubber sheet is a backing sheet 12 of suitable material, such for instance as burlap, although other material may be employed as a backing to reinforce the more or less flimsy sheet of rubber material. The backing sheet 12 touches and is secured to the peaks or tops of the embossments or corrugations at one side of the rubber sheet as by a layer or coating 13 of cement, rubber or the like, or by being vulcanized directly thereto. This backing sheet bridges and closes the open sides of the embossments at one side of the rubber sheet and ties together the closed sides of successive embossments or corrugations on the same side of the sheet and thereby prevents collapse of the hollow embossments which have their open sides closed by the backing sheet 12. The backing sheet also reinforces the corrugated rubber sheet, and puts the composite sheet in proper condition for handling, as well as preventing collapse of the corrugated or embossed rubber sheet.

The present product is comparable to a sponge or cellular rubber sheet, and has the advantage that, while blowable cellular or sponge rubber may be used, nevertheless, inexpensive non-cellular rubber stock may be employed, for the reason that by corrugating or providing the rubber sheet with hollow open sided embossments and employing the backing sheet as shown, the composite sheet will have a plurality of air cells defined by the hollow corrugation. The corrugations are open to the atmosphere at opposite ends of the corrugations, and these small openings permit breathing so that the desired cushioning effect is obtained.

While in Figure 1, the composite product is shown with the backing sheet 12 on the underside of the rubber sheet 10, yet when employing the product as a rug or carpet underlay, the backing sheet 12 may be uppermost or on top whereby the backing sheet will present a rough coarse surface to the underside of a rug or carpet laid thereon and tend to prevent slipping of the rug or carpet edgewise, and thus the new product has advantageous non-slip characteristics.

An apparatus for producing the product of the invention has been shown diagrammatically in Figure 2, wherein 14 designates a suitable calender for continuously forming a batch of rubber stock 15 into the sheet 10 which is led from the calender around the periphery of a rotatable hollow drum 16 having spaced longitudinal ribs 17, by an endless belt 18 trained around suitable guide rolls 19 and 19' and also around a belt tensioning roll 20, the guide rolls 19 being positioned with respect to the drum 16 so as to cause a portion of the belt to partially embrace the periphery of the drum in close relation therewith to cause the rubber sheet 10 to hug a substantial extent of the periphery of the drum. The pressure of the belt 18 against the drum 16 may be regulated by adjustment of the tension roll 20. In the calendering operation the rubber is heated, and if supplied directly therefrom to the drum 16, as shown in the drawing, so that it is not appreciably cooled it is soft enough so that it will gravitate into the channels of the shaping drum 16. However, a suction pull may be added to that of gravity, as by the employment of radial openings 21 provided through the peripheral wall of the drum 16, preferably in the form of slots extending the length of the drum and preferably located between successive ribs 17 so as to constitute passages communicating between the interior chamber 22 of the hollow drum and the channels 23 between the ribs 17. The interior chamber 22 of the drum will be put in communication at one or both ends of the drum with an air exhaust or suction apparatus, not shown, so that the portion of the rubber strip which is partially embracing the drum in contact with the outer edges of the ribs 17 will be subjected to the pull of the exhaust or suction drum and thereby sucked or drawn into the channels 23, whereby the rubber sheet will be caused to take on the corrugated shape of the periphery of the drum, thus providing the sheet with the hollow ribs 11 constituting hollow embossments which are open throughout their outer sides. Preferably the drum 16 is provided, at either end, with an annular flange 28, or other appropriate means for closing the ends of the drum channels 23 in order to insure the effectiveness of the suction upon the rubber material.

If desired, the hollow shaping drum may also be heated, in any suitable manner, not shown, but preferably by the injection of steam into the interior chamber 22 of the drum, so as to vulcanize the rubber sheet during the shaping thereof and while the backing sheet is being applied thereto.

While any suitable manner of exhausting air from the chamber 22, and also of heating the drum 16 may be employed, we contemplate rotatably supporting each closed end of the drum on a fixed stub shaft 24, which may be provided with passages 25 and 26, communicating with the chamber 22, one for connection with an air exhaust or suction device and the other for connection with a source of steam for heating the drum. Other ways of heating the drum may be employed for softening the rubber so that it may readily conform to the corrugated periphery of the drum, and for vulcanization purposes where vulcanization is desired when the rubber sheet is on the drum. Also other ways of exhausting air from or providing a suction in the chamber 22 may be employed.

Ordinarily the rubber sheet will, by reason of its softened condition, gravitate into the channels 23 and remain there until stripped or led away from the drum by the pull of a winding drum or roll, not shown, employed for storing the completed product. However, suction may be employed, if desired, to assist in conforming the rubber sheet to the corrugations.

Any suitable means may be employed for closing such openings 21 as may not be covered by the rubber strip, as for instance a fixed closure member 27 supported from the fixed stub shafts on which the drum 16 rotates. However, it is not absolutely necessary to provide for closing such openings as only a slight pull on the rubber sheet in addition to that of gravity will suffice if gravitation in some instances is not altogether satisfactory. Also, we contemplate closing the opposite ends of the channels 23, as by means of an annular flange 28 at each end of the drum, if under some conditions it should become necessary or desirable in order to obtain the desired pull or suction on the rubber sheet passing around the drum.

The flexible backing sheet 12 of suitable textile or other strong and durable preferably open material, such as burlap, Osnaburg, or the like, is led, from a source of supply 29, between the portions of the rubber sheet 10 and the belt 18, which partially embrace the drum 16, so that the burlap will be carried along with the rubber sheet or strip in contact with the outer closed sides of the ribs 11 of the rubber sheet until the corrugated rubber sheet and the backing sheet thereon are discharged from the apparatus at the point where the guide roll 19' leads the endless belt 18 away from the drum. It will here be explained that the rubber sheet portion which is being fed around the embossment-forming or shaping drum is sufficiently soft to conform to the shape of the periphery of the drum under the suction action.

The backing sheet being relatively porous and inelastic, will not be sucked into the corrugations of the drum but will remain in its original condition and will lie against the outer closed sides of the corrugations or embossments of the rubber sheet to which the backing sheet will be connected, as by the employment of a suitable cement or rubber coating 13 applied to either or both of the sheets preparatory to being passed around the forming or shaping drum.

Each or any selected rotating or moving element of the apparatus may be driven according to the character and condition of materials employed and the conditions under which the apparatus may be operating.

Vulcanization need not necessarily be accomplished during the laminating and forming operations on the drum 16, as the important consideration is the embossing of the rubber sheet and the assembly therewith of the backing sheet. If vulcanization does not occur, or is only partially attained, by the heat of the drum, then the laminated sheet leaving the same may be subjected to further heat treatment in a suitable apparatus, such as a belt conveyor or festoon vulcanizer, for the purpose of producing or completing vulcanization. However, the employment of a heated hollow shaping drum lends itself admirably to the heating step of vulcanization simultaneously with the shaping of the rubber sheet.

While the calendering of a batch of rubber stock followed immediately by the embossing step and the assembly of the embossed sheet and the backing sheet is desirable and important, it will of course be understood that a preformed rubber sheet may be fed to the shaping drum from a suitable source of supply, such as a roll of a continuous strip of rubber, and heated by the heating drum sufficiently to soften the rubber sheet or strip so that it will conform to the configuration of the periphery of the drum.

Wherever in the specification and claims the term "rubber" or "rubber-like material" is used the same is intended to include natural rubber compounds and any similar natural or synthetic thermoplastic vulcanizable substances.

It is an important feature of the present invention that in the shaping of the rubber sheet in the corrugated form no companion corrugating roll or drum is employed, this being important as the soft, heated unvulcanized rubber is likely to stick thereto and interfere with the proper retention of the rubber sheet in the corrugations of the drum 16.

Thus as the heated soft sheet rubber is laid on the drum 16 it straddles the valleys between the adjoining corrugations thereof and solely by gravity, assisted by suction if necessary, the straddling rubber is distended and sinks into the valley and thereby conforms to the corrugated form of the surface of the drum 16, in which position it is maintained until vulcanized and removed from the drum. By this method no companion corrugation roll is required, the rubber being given the corrugated shape by application of shape defining means to only one side of the rubber sheet and any disturbance or displacement of the rubber after it is shaped to the corrugated form of the drum surface is thereby avoided. Accordingly the valley straddling portions of the rubber sheet are pulled down into the valleys as distinguished from pushing thereof into the valleys by a mating corrugated roll.

The hollow ribs or corrugations 11 of this composite sheet may if desired contain a filler which is held therein by the backing sheet 12. Such filler may be of ground sponge rubber, sawdust or the like.

While we have described our invention in a preferred form, we are aware that various changes and modifications may be made without departing from the principles of our invention, the scope of which is to be determined by the appended claims.

What we claim is:

1. The method of making laminated cushion material of the class described, which said method comprises calendering a sheet of vulcanizable plastic material, then heat softening the sheet progressively lengthwise and pulling successive heat softened portions thereof consecutively sidewise and thereby forming successive corrugations, then continuously advancing a backing sheet conjointly with the corrugated vulcanizable plastic sheet along a predetermined path in contacting side by side relation and, throughout a substantial length of said path, constantly compressing said backing sheet against crown portions of a series of the corrugations and simultaneously subjecting said crown portions to vulcanizing temperature and thereby vulcanizing said crown portions to the backing sheet.

2. The method of making laminated cushion material of the class described, which said method comprises calendering a sheet of vulcanizable plastic material, then heat softening the sheet progressively lengthwise and pulling successive heat softened portions thereof consecutively sidewise and thereby forming successive corrugations, then continuously advancing a backing sheet conjointly with the corrugated vulcanizable plastic sheet along a semi-circular path in contacting side by side relation and, throughout said path, constantly compressing said backing sheet against crown portions of a series of the corrugations and simultaneously subjecting said crown portions to vulcanizing temperature and thereby vulcanizing said crown portions to the backing sheet.

3. The method of making laminated cushion material of the class described, which said method comprises calendering and thereby heating a sheet of vulcanizable plastic material, then, before dissipation of any appreciable heat of calendering, further heating and softening the sheet progressively lengthwise and pulling successive heat softened portions thereof consecutively sidewise and thereby forming successive corrugations, then continuously advancing a backing sheet conjointly with the corrugated vulcanizable plastic sheet along a predetermined path in contacting side by side relation and, throughout a substantial length of said path, constantly compressing said backing sheet against crown portions of a series of the corrugations and simultaneously subjecting said crown portions to vulcanizing temperature and thereby vulcanizing said crown portions to the backing sheet.

GEORGE W. BLAIR.
VIRGIL H. BODLE.

REFERENCES CITED

The following references are of record in the file of this patent:

UNITED STATES PATENTS

| Number | Name | Date |
|---|---|---|
| 239,159 | Gaussen | Mar. 22, 1881 |
| 1,349,560 | Cobb | Aug. 17, 1920 |
| 1,513,709 | Letzkus | Oct. 28, 1924 |
| 2,055,877 | Palmer | Sept. 29, 1936 |
| 2,275,425 | Grabec | Mar. 10, 1942 |
| 2,288,054 | Walton | June 30, 1942 |
| 2,299,988 | Irving | Oct. 27, 1942 |

FOREIGN PATENTS

| Number | Country | Date |
|---|---|---|
| 506,599 | Germany | Sept. 5, 1930 |